E. B. DE LA RUE.
EGG INCUBATION.
APPLICATION FILED JULY 26, 1919. RENEWED MAR. 18, 1922.
1,433,262.
Patented Oct. 24, 1922.
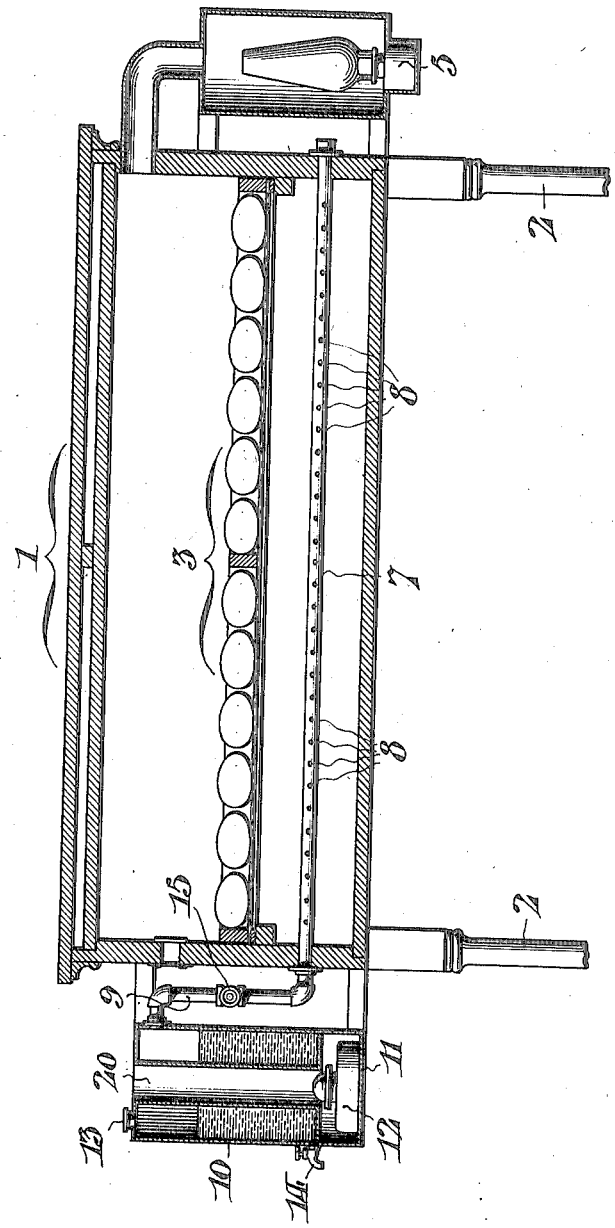
Witnesses
John C. Bergner.
James H. Bell
Edward B. De La Rue,
by Munn & Paul
Attorneys.

Patented Oct. 24, 1922.

1,433,262

UNITED STATES PATENT OFFICE.

EDWARD B. DE LA RUE, OF DEVON, PENNSYLVANIA.

EGG INCUBATION.

Application filed July 26, 1919, Serial No. 313,460. Renewed March 18, 1922. Serial No. 544,978.

*To all whom it may concern:*

Be it known that I, EDWARD B. DE LA RUE, of Devon, in the county of Chester and State of Pennsylvania, have invented certain new and useful Improvements in Egg Incubation, whereof the following is a specification, reference being had to the accompanying drawings.

My invention relates to improvements in artificial incubation of eggs having special reference to the admission of moisture to the eggs being incubated.

It has heretofore been common to provide moisture in incubators by means of pans or sponges containing water. These methods, however, have never proved entirely successful, owing to the fact that the vapor pressure in any incubating chamber, and, therefore, the amount of moisture absorbed by the air, depends on temperature, climatic conditions, and the amount of air circulation in the incubating chamber, conditions which vary greatly from day to day.

I have discovered, however, that by admitting live steam to the interior of the incubating chamber at intervals during the period of incubation, these difficulties may be overcome, and the requisite amount of moisture may be obtained, irrespective of variations in vapor pressure. In addition to this, the egg shells are softened by the steam, and loosened so that they do not stick to the chicks at hatching.

In the drawing I have shown a transverse vertical section of an incubator having appropriate steam connections for practicing my invention.

The incubator shown comprises an incubating chamber 1, formed in a casing mounted on legs 2. Within the chamber I provide an ordinary egg tray 3, upon which the eggs may be placed. The chamber is heated by any suitable means, such as the lamp 5, with the usual hot air circulation controlled by appropriate thermostatic means, as well-known in the art. This keeps the temperature constant at the proper point and regulates the amount of air admitted to the chamber 1.

In the lower part of chamber 1, I provide a pipe 7, which may extend longitudinally therethrough below the egg tray. Pipe 7, is provided with a plurality of apertures 8, and is connected by suitable means, such as the pipe 9, to a tank or boiler 10. This tank is shown in the drawings in the form of a cylinder having a central aperture 20, with a support 11, provided below it for a lamp 12, or other suitable means for heating the water in the tank. Tank 10, may be filled from an inlet opening 13, and emptied through an outlet opening 14, which may be arranged in any form desired. Pipe 9, is provided with a suitable valve 15, by which the admission of the steam generated in the tank 10, to pipe 7, may be regulated.

In carrying out my improved process, water is placed in tank 10, and heated by lamp 12, until a sufficient quantity of steam is generated. By turning valve 15, the steam is then admitted to pipe 7, and passes into the incubating chamber 1, through openings 8, which may be formed on one or both sides of pipe 7. The amount of steam admitted can be controlled by the valve. The admission of steam in this way saturates the air in chamber 1, and provides the moisture necessary to proper incubation, and furthermore, penetrates the egg shells, thereby softening and loosening them.

In practice I have found that good results are obtained by admitting steam for a period of thirty seconds twice each day after the seventh day. This is continued until the nineteenth day. During the nineteenth and twentieth days, however, steam is admitted three times a day for a period of thirty seconds, this being repeated on the twenty-first day if the eggs have not already started to hatch. In such case it may even be advisable on that day to admit steam for a longer period than thirty seconds.

The invention, however, is not limited or confined to the arrangement and form of incubator shown in the drawings, but may be practiced with any devices which provide means for supplying steam and means for periodically subjecting eggs to the action of the same in controlled quantities. This voluminous bath of live steam may be produced, for instance, by introducing into the incubator chamber beneath the eggs a large pad (or a blanket sufficiently folded) soaked or saturated with boiling hot water, allowing it to remain for some fifteen to thirty seconds or a little longer, etc.,—according to the schedule stated above.

Having thus described my invention, I claim:

1. The process of egg incubation which consists in subjecting the eggs to air at the proper temperature during the incubation period, and also subjecting them periodically for short intervals to a bath of live steam.

2. The process of egg incubation which consists in maintaining eggs at incubating temperature during the incubation period, and also subjecting them for brief intervals of time to a vapor bath at a temperature considerably above the incubating temperature.

3. The process of egg incubation which consists in maintaining the eggs at incubating temperature during the incubation period, and subjecting them periodically to a bath of live steam.

4. The process of egg incubation which consists in maintaining the eggs at incubating temperature during the incubation period, and periodically subjecting them for a short interval to a voluminous bath of live steam.

5. The process of egg incubation which consists in maintaining the eggs at incubating temperature during the incubation period, exposed to the atmospheric air as usual, and periodically subjecting the eggs, for brief intervals, to a voluminous bath of live steam at a temperature considerably above the incubating temperature.

6. The process of egg incubation which consists in maintaining eggs at incubating temperature during the incubation period, and periodically subjecting the eggs to a voluminous bath of vapor at a temperature exceeding the incubating temperature.

7. The process of egg incubation with exposure to live steam, substantially herein set forth and described.

In testimony whereof, I have hereunto signed my name at Philadelphia, Pennsylvania, this 24th day of July, 1919.

EDWARD B. DE LA RUE.

Witnesses:
JAMES H. BELL,
E. L. FULLERTON.